(12) United States Patent
Kurihara

(10) Patent No.: US 6,924,956 B2
(45) Date of Patent: Aug. 2, 2005

(54) HEAD LOADING/UNLOADING CONTROL SYSTEM FOR USE IN DISK DRIVE APPARATUS

(75) Inventor: Hiroshi Kurihara, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 353 days.

(21) Appl. No.: 10/140,302

(22) Filed: May 8, 2002

(65) Prior Publication Data

US 2002/0167750 A1 Nov. 14, 2002

(30) Foreign Application Priority Data

May 8, 2001 (JP) .......................................... 2001-137052

(51) Int. Cl.[7] .............................................. G11B 21/02
(52) U.S. Cl. ............................................ 360/75; 360/69
(58) Field of Search ........................ 360/69, 75, 78.01, 360/78.04

(56) References Cited

U.S. PATENT DOCUMENTS 5,495,156 A * 2/1996 Wilson et al. .............. 318/368
5,969,899 A * 10/1999 Utenick et al. ........... 360/78.04
6,316,898 B1 * 11/2001 Albrecht et al. ............. 318/560
6,396,652 B1 * 5/2002 Kawachi et al. ............... 360/75
6,466,391 B1 * 10/2002 Lee et al. ...................... 360/75
6,594,102 B1 * 7/2003 Kanda et al. .................. 360/75

FOREIGN PATENT DOCUMENTS

JP 2000-21073 1/2000

* cited by examiner

Primary Examiner—Sinh Tran
Assistant Examiner—Jason Olson
(74) Attorney, Agent, or Firm—Pillsbury Winthrop Shaw Pittman LLP (57) ABSTRACT

A method for controlling head loading/unloading operations in a magnetic disk drive apparatus that can perform a head retracting operation by using a reserve power source in order to retract head elements to a predetermined rest position even when a primary power source has shut down during the operation of the apparatus has been developed. In order to guarantee proper power off unloading of head elements at a shutdown time of the primary power source, a system within the magnetic disk apparatus judges, prior to start the head loading control, whether a sufficient electric power is secured in a reserve system in order to retract the head elements to a predetermined rest position if a shutdown of the power source occurs.

7 Claims, 7 Drawing Sheets

HEAD LOADING/UNLOADING CONTROL SYSTEM FOR USE IN DISK DRIVE APPARATUS

CROSS-REFERENCE TO RELATED APPLICATIONS

This application claims the benefit of priority from Japanese Patent Application No. 2001-137052, filed on May 8, 2001. This application is hereby incorporated by reference in its entirety.

BACKGROUND OF THE INVENTION

1. Field of the Invention

The present invention relates to a disk drive apparatus having a head loading/unloading control system and a method for controlling head loading/unloading operations in the apparatus. More particularly, it relates to an apparatus and a method for performing reliable head loading/unloading operations even when a shutdown of a primary power source occurs during the operation of the disk drive apparatus.

2. Description of the Related Art

Conventionally, a magnetic disk drive apparatus, such as a hard disk drive apparatus, (hereinafter simply referred to as a "disk drive") is used for writing and/or reading data on and from a data recording disk medium (hereinafter referred to as a "disk") by loading magnetic head elements onto a target track in the disk when the rotation speed of the disk reaches a steady state. A spindle motor (SPM) rotates the disk. The head loading and/or unloading operations are controlled by a central processing unit (CPU) installed in the apparatus.

The writing/reading head elements are initially rested upon a rest position. During the writing/reading operations, the head elements are loaded from the rest position so as to float closely above a surface of the disk when the rotation speed of the disk reaches a steady state in order to avoid possible damage of data areas in the disk due to contact between a head surface and a disk surface.

In order to prevent the head surface from contacting the rotating disk surface during the head drive operations, usually, the disk drive applies a contact-start-stop (CSS) system or a loading/unloading system. In the CSS system, the head elements are placed on a retract zone (CSS area) in the disk when the disk is in a non-rotation state. Conventionally, the disk drive of the CSS system includes a ring shaped CSS area at an inner side of the data zone of the disk. In the disk drive of the head loading/unloading system, the head elements are retracted (unloaded) onto a rest unit (hereinafter, simply referred to as a "ramp unit") provided at near the outer edge of the disk during when the disk is in a non-rotation state. In both systems, the head elements are moved by the rotation of a voice coil motor (VCM). A VCM drive circuit supplies VCM drive currents in order to rotate the VCM.

In order to increase the data recording density of the disk, the head surface is floated very closely to the disk surface. Thus, the data recording density of the disk can be increased by reducing the head floating height. However, the damages due to contact of the head surface with the disk surface also increases when the head floating power is reduced. Thus, if a shutdown of the primary power source for the apparatus occurs during the operations of the disk drive, the head surface will likely contact the disk surface due to the inertia rotation of the spindle motor (SPM). In order to avoid this defect in the disk drive, it needs to retract the head elements to the CSS area or the ramp unit before stopping the spindle motor (SPM). However, since the primary power source has already shutdown, there is a need to supply the VCM drive current in order to move the head elements to the rest position from a reserve power source.

Conventionally, it has been proposed to perform a stabilized head retracting operation at the time of a sudden shutdown of the primary power source. For example, Japanese Patent Application No. 2000-21073 (the same assignee of this invention) has proposed to acquire data for controlling the head retraction based on a head position in a determination process during a normal operation of the disk drive. Thus, in order to immediately perform the head retracting operation at a shutdown time of the power source with a lower electric power, the data for controlling a head retraction is periodically acquired during a normal head driving control time. When a shutdown of the primary power source occurs, the head elements are moved to a retraction place by driving through an auxiliary power supply. As the auxiliary power supply, a condenser or the back electromotive voltages of the SPM are proposed.

The proposed head retracting operation by using the auxiliary power supply, however, includes some defects. For example, if the primary power source is shut down immediately after the disk drive is operated, it is impossible to charge a sufficient battery voltage in the condenser or to obtain a sufficient auxiliary power, by rectifying the back electromotive force of the inertia rotation of the SPM, for retracting the head elements.

Moreover, there is a possibility to have a failure of the condenser even after a shutdown of the primary power source has occurred. If the primary power source has shutdown in such a state, it is impossible to retract the head elements to the rest position.

SUMMARY OF THE INVENTION

Therefore, there is a need for an apparatus and method to reliably perform a head retracting operation to a predetermined rest position when a shutdown of the primary power source occurs during the operations of the disk drive. The disk drive apparatus and methods according to the present invention solve the aforementioned problems and defects of the conventional disk drive apparatus and the head loading/unloading operations thereof. Namely, an object of the present invention is to provide a disk drive and a method for reliably performing head retracting operation when a shutdown of the primary power source for the apparatus occurs.

In order to achieve the above-mentioned objects, according to the present invention, there is provided a magnetic disk drive apparatus having a judging mechanism for judging whether a sufficient reserve power source for performing the head retracting operation has already been secured even when a shutdown of a primary power source occurs during the operations of the disk drive, and only when it is judged that a sufficient reserve power source has already been secured, a control of the head loading operation is started.

A characteristic feature of the magnetic disk drive apparatus consistent with the invention is to judge whether the disk drive apparatus has a sufficient reserve power supply for performing the head retracting operation to a rest position prior to starting the head loading operation in the apparatus.

The magnetic disk drive apparatus consistent with the invention includes: a detector for detecting a shutdown of a primary power source; a controller for controlling the head movements onto a target position in a recording medium by controlling the drive of a voice coil motor, the controller retracting the head elements to a rest position when the detector detects a shutdown of the primary power source by controlling the drive of the voice coil motor; and a reserve power source for supplying a necessary power for retracting the head elements to the rest position when the detector detects a shutdown of the primary power source; wherein, the controller judges whether the reserve power source has charged the necessary power for the head retracting operation prior to starting the head loading control. Thus, the controller starts the head loading control only when the controller has judged that the reserve power source has charged a sufficient power for performing the head retracting operation.

The magnetic disk drive apparatus consistent with the invention can achieve a reliable head retracting operation even when a shutdown of a primary power source occurs just after the disk drive apparatus has started its operation, since the controller judges whether the reserve power source has secured a necessary power for performing the head retracting operation to a predetermined rest position prior to starting the head loading control. Thus, the magnetic disk drive apparatus consistent with the invention can reliably perform the head loading/unloading operations in a primary power-off time.

An embodiment consistent with the present invention relates to a magnetic disk drive apparatus including a condenser for charging an electric power as the reserve power source. Thus, the controller in the embodiment consistent with the present invention judges whether the condenser has charged a necessary power for performing a head retracting operation at a time when a shutdown of the primary power source occurs, prior to starting the head loading operation.

Another embodiment consistent with the present invention relates to a magnetic disk drive apparatus including a condenser for charging an electric power and a rectifying circuit for rectifying the electromotive force of a spindle motor as the reserve power source. Further, the magnetic disk drive apparatus includes a judging mechanism for judging whether a sufficient reserve power has obtained prior to starting the head loading operation in order to perform the head retracting operation at a time when a shutdown of the primary power source occurs.

The magnetic disk drive apparatus consistent with the present invention includes head loading/unloading functions and a head retracting function in order to retract head elements to a predetermined rest position when a shutdown of a primary power source occurs; the apparatus including: a reserve power source configured to be charged from the primary power source; a detector configured to detect the power charged in the reserve power source; a judging unit configured to judge whether the reserve power source has charged a necessary power for retracting the head elements to the rest position when a shutdown of the primary power source occurs; and a control unit configured to allow head loading operation only when it is judged that the reserve power source has charged the necessary power.

BRIEF DESCRIPTION OF THE DRAWINGS

The accompanying drawings, which are incorporated in and constitute part of this specification, illustrate various embodiments and/or features of the invention and together with the description, serve to explain the invention. Wherever possible, the same reference numbers will be used throughout the drawings to the same or the like parts. In the drawings.

DETAILED DESCRIPTION

Figure 1:
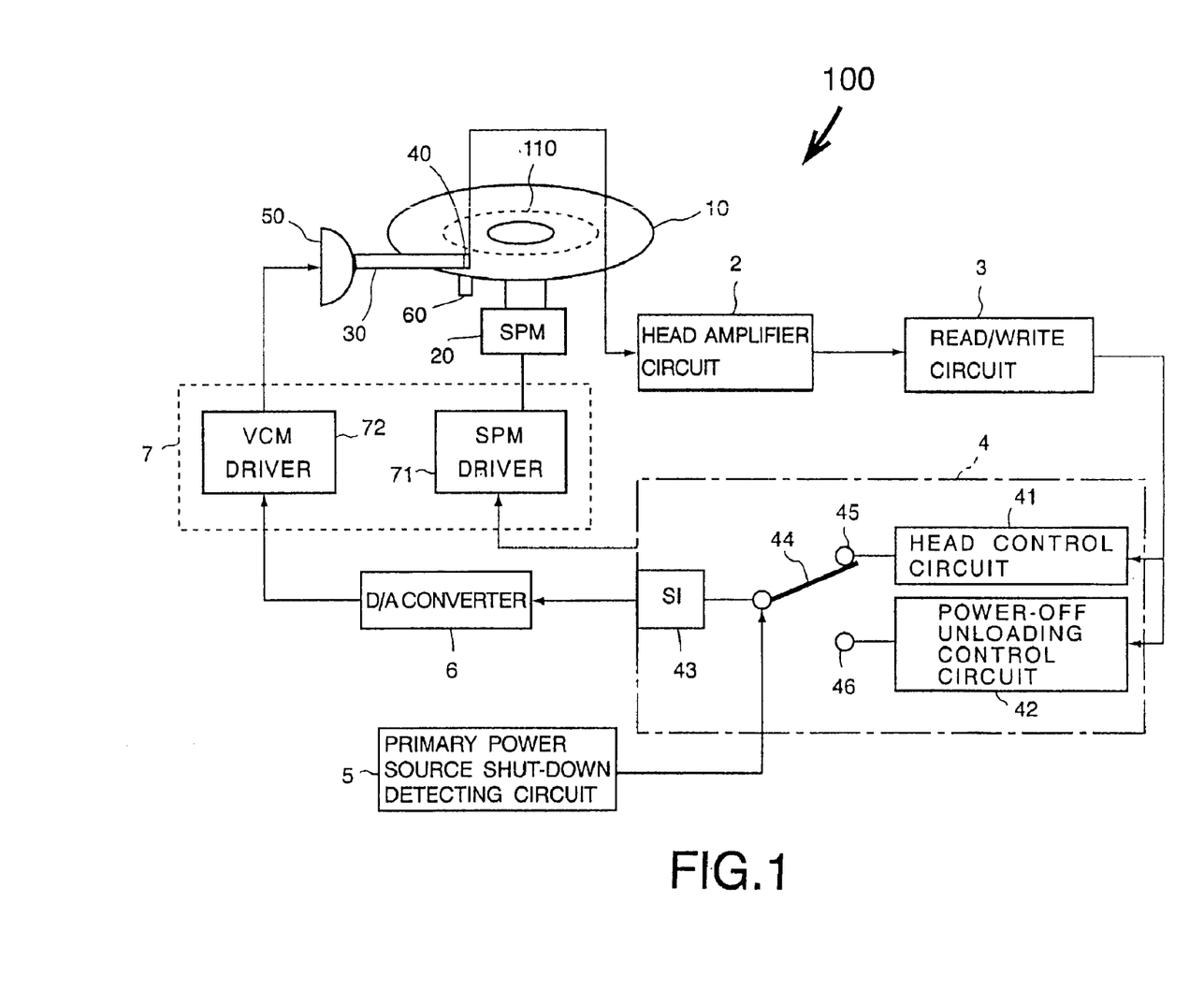
FIG. 1 is a functional block diagram of an exemplary configuration for magnetic disk drive apparatus in which methods and apparatus consistent with the present invention may be implemented.

Reference will now be made in detail to the exemplary embodiments of the invention, examples of which are illustrated in the accompanying drawings. FIG. 1 illustrates the main components of a magnetic disk drive apparatus 100 consistent with the invention. The disk drive 100 includes a magnetic recording disk medium 10 of which surfaces are coated with magnetic material, a spindle motor (SPM) 20 for rotating the disk 10, and a rotary actuator 30 for driving a head slider 40 along a radius direction of the disk 10. The actuator 30 includes a suspension arm for holding the head slider 40, and a voice coil motor (VCM) 50 for rotating the head slider 40. The head slider 40 supports a pair of magnetic head elements, i.e., a write head for writing data into the disk 10, and a read head for reading data from the disk 10. Although only a first head slider 40 is illustrated in order to simplify the drawing, a practical disk drive apparatus includes a second head slider facing a bottom surface if the disk 10 is for writing and reading data. Furthermore, it is also possible to stack a plurality of disks 10.

During operation of the disk drive apparatus 100, the SPM 20 rotates the disk 10 at a high-speed in a counterclockwise direction. The read/write head elements supported on the head slider 40 are floating close to a surface of the rotating disk 10. Thus, the head slider 40 moves closely to a surface of the disk 10 along generally a radius direction of the disk 10 by rotation of the rotary actuator 30. The rotary actuator 30 moves the heads and determines a head position on a target track of the disks 10 under a servo control. After seeking and positioning on a target track in the disk 10, the head elements scan the track by the rotation of the disk 10 in order to read servo patterns recorded in servo areas on the track in the disk. A write head records data onto a target data sector in the disk 10.

The disk drive 100 further includes a head amplifier circuit 2, a read/write (R/W) circuit 3, a CPU 4, a primary power source shutdown detecting circuit 5, a D/A converter 6, and a motor driver 7. Each of head elements on the head slider 40 is coupled to the head amplifier circuit 2. Usually the head amplifier circuit 2 is provided on a flexible printing circuit board (FPC). The head amplifier circuit 2 amplifies analog output signals reproduced by the read head from the disk 10. The head amplifier 2 further includes a write amplifier for converting write data supplied from the read/write circuit 3. The read/write (R/W) circuit 3 decodes data from the reproduced signals. The R/W circuit 3 includes a servo patterns reproducing circuit. Thus, the decoded data from the reproduced signals includes servo patterns.

The R/W circuit 3 includes an automatic gain control (AGC) function for amplifying the analog (read) signals supplied from the head amplifier circuit 2 to a certain voltage and a decoding function (read channel) for performing a signal processing necessary for amplifying the read signals throught the AGC function, such as a reproduction of NRZ code data. Further, the R/W circuit 3 has an encoding function (write channel) for recording data into the disk 10 and a servo extraction function for extracting servo patterns from the read signals.

The motor driver 7 includes a SPM driver 71 for driving the SPM 20 and a VCM driver 72 for driving the VCM 50. The SPM 20 is rotated at a high speed by driving the control current supplied from the SPM driver 71. Thus, the disk 10 is rotated at a high speed. The VCM driver 72 supplies the control current to the VCM 50 in order to drive the rotary actuator 30. In this embodiment, the motor driver 7 is made as an integrated circuit of 1-chip. Each of the control currents respectively supplied from the SMP driver 71 and VCM driver 72 is determined by the CPU 4.

The CPU 4 is a main controller for the disk drive 100. The CPU 4 includes a read only memory (ROM) (not shown) for storing control programs for performing various operations in the disk drive 100. For example, a head control program performs head seeking and head positioning based on the servo patterns extracted by the R/W circuit 3. As illustrated in FIG. 1, CPU 4 includes a head control circuit 41, a switch 44, and a serial interface (SI) 43. The bead control circuit 41 provides control for driving the VCM driver 72 in order to drive the head elements onto a target position in the disk 10 by calculating a distance between the target position and a present head position. During a normal condition, the switch 44 connects between the output terminal 45 of the head control circuit 41 and the SI 43. Thus, the control amount calculated by the head control circuit 41 is supplied to the VCM driver 72 through the digital/analog D/A) converter 6.

Further, CPU 4 includes a power-off unloading control circuit 42. When the primary power source shutdown detecting circuit 5 detects an occurrence of a shutdown of the primary power source, the switch 44 is changed to connect between the output terminal 46 of the power-off unloading control circuit 42 and the SI 44. The primary power source shutdown detecting circuit 5 detects the shutdown by monitoring a voltage level Vcc of the power source.

CPU 4 further includes a head unloading function for performing the head retracting operation to the ramp block 60 when a shutdown of the primary power source occurs. For the head unloading control at a shutdown of the primary power source, the control amount necessary for retracting the head elements from a presently loaded position to the ramp block 60 is calculated based on a distance between a retracting position and a presently loaded position. Thus, CPU 4 includes a power-off unloading control circuit 42 and the switch 44 for switching the outputs of the head control circuit 41 and the power-off unloading control circuit 42. Thus, when the primary power source shutdown detecting circuit 5 detects a shutdown of the primary power source, the switch circuit 44 is connected to an output terminal 46 of the power-off unloading control circuit 42.

The D/A converter 6 converts a digital control amount supplied through the SI 43 in CPU 4 to an analog control amount in order to supply to the VCM driver 72. When a shutdown of the primary power source occurs, it needs to retract the head elements to the ramp block 60 by supplying a reserve power source to a head unloading control circuit system. Thus, the CPU 4, the D/A converter 6 and the VCM driver 72 construct the head unloading control circuit system. The detail structure of the reserve power source is explained later.

A disk surface includes a predetermined number of reference servo areas and a multiplicity of tracks. The reference servo patterns include track address codes for detecting each of track position and servo burst signals for detecting a head position in each of tracks. In this embodiment shown in FIG. 1, the disk 10 includes an unload head waiting area 110 at a middle portion between a most outer data track and a most inner data track whereby the head elements are held when any command is not given from the host system for a certain time.

Figure 2:
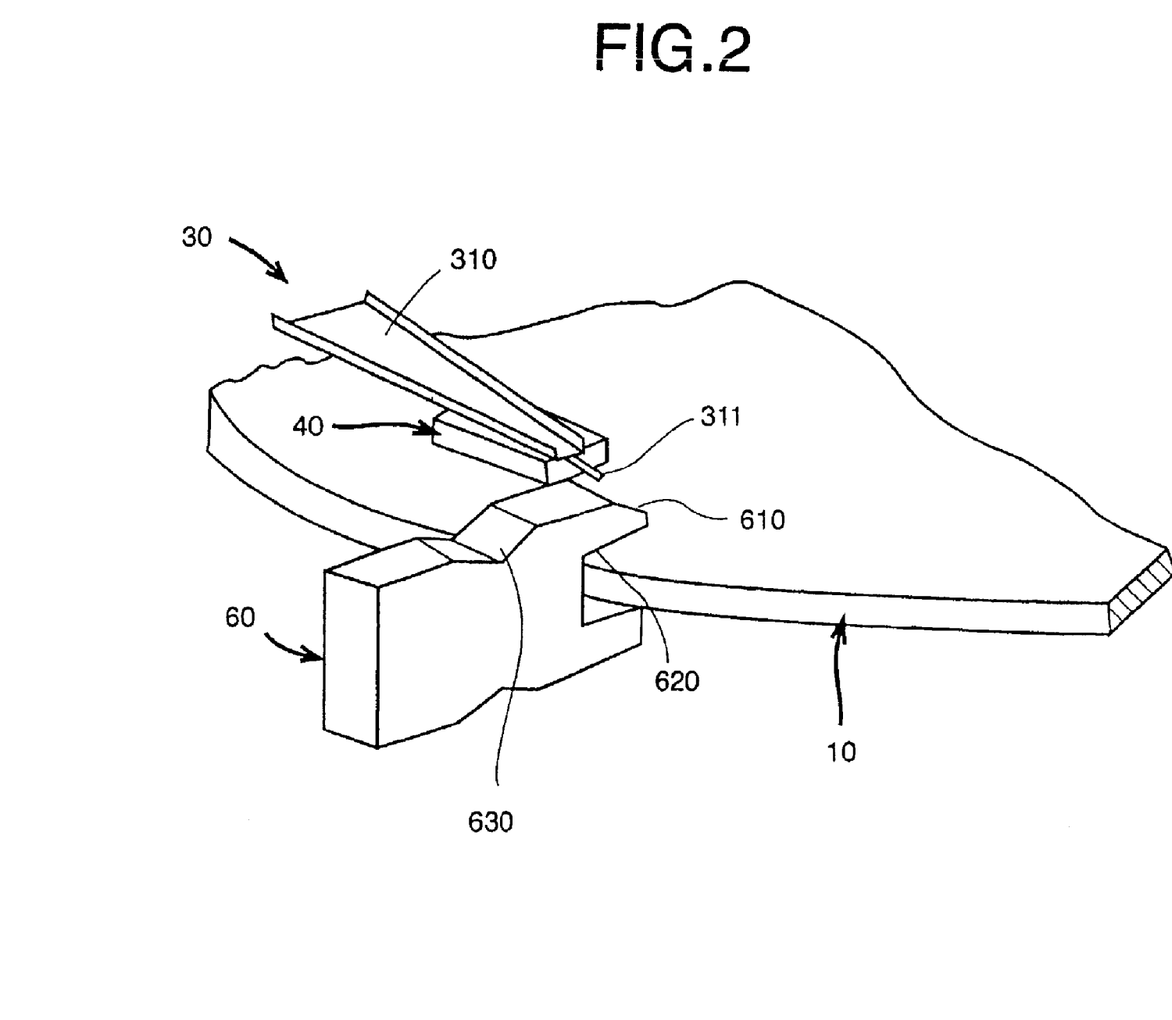
FIG. 2 depicts a partially enlarged view illustrating the main components of the magnetic disk drive apparatus as depicted in FIG. 1 in order to explain the retracting operation of head elements to a ramp unit.

As illustrated in FIG. 2, when a shutdown of the primary power source is detected, the head slider 40 is retracted onto the ramp block 60. During the head unloading operation, an opposite drive current to the head loading operation is supplied to the VCM 50. By supplying the head unloading current to the VCM 50, the rotary actuator 30 is moved to outside of the disk 10 so that the head suspension arm 310 reaches the ramp block 60. The head suspension arm 310 includes a top tab 311 for guiding and retracting the head suspension arm 310 to the ramp block 60. The ramp block 60 is provided on the rotation path of the top tab 311 and positioned close to the outer edge of the disk medium 11.

The ramp block 60 includes a slanted portion 610 for guiding the top tab 311 and sliding the head elements away from the surface of the disk medium 10. The ramp block 60 includes a U-shaped groove 620 for holding a non-data area of the outer edge of the disk. When the top tab 311 of the suspension arm 310 reaches the slanted portion 610, the VCM driving force slides the top tab 311 upward along the slanted portion 610 in order to separate the head elements from the disk surface so that the head reaches a retract position 630 on the ramp block 60.

Figure 3:
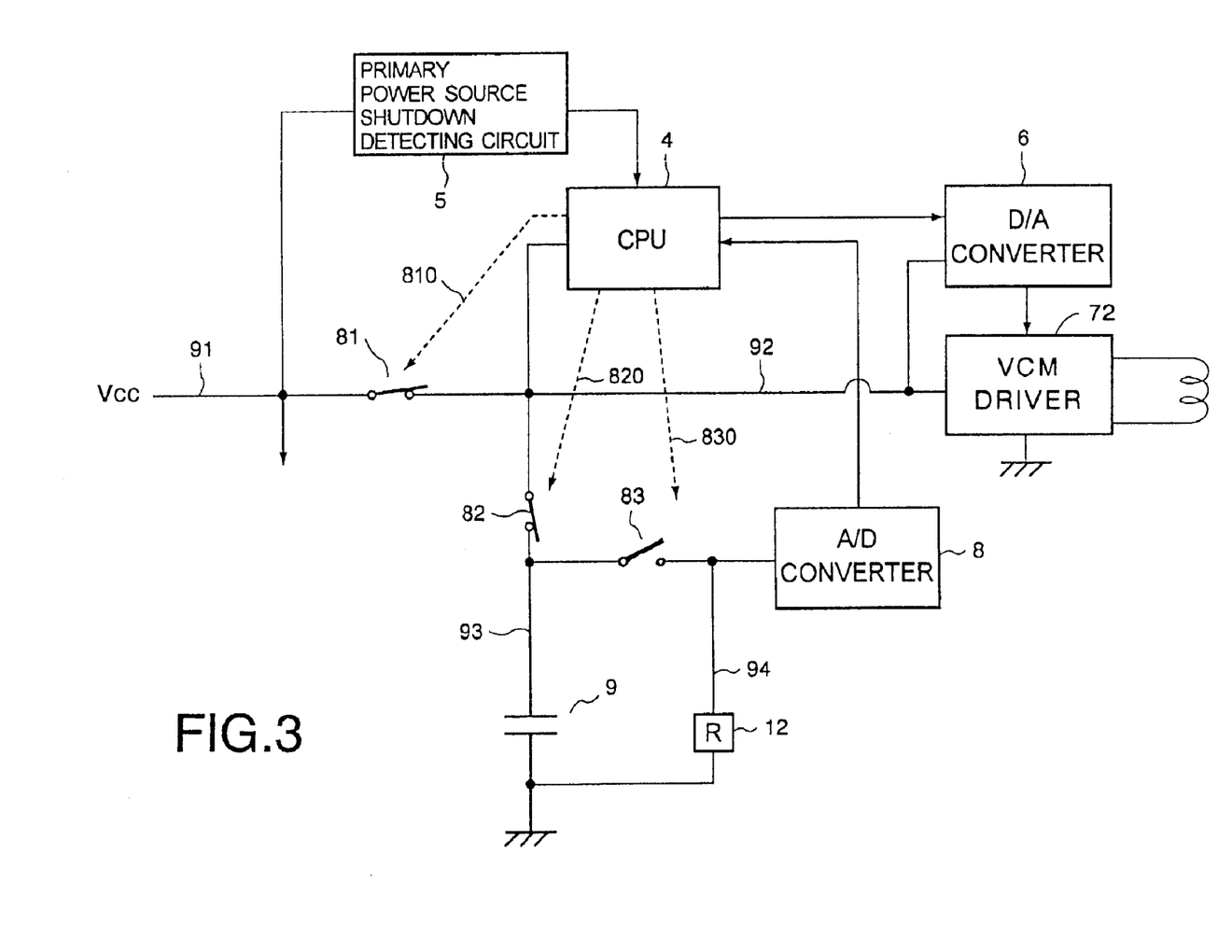
FIG. 3 is a functional block diagram of an exemplary configuration for a reserve power source for achieving a reliable head unloading operation at a shutdown of the power source of the magnetic disk drive apparatus in which methods and apparatus consistent with the present invention may be implemented.

FIG. 3 illustrates an embodiment of the reserve power source system implemented in disk drive apparatus consistent with the invention. As explained above, the reserve power source supplies a necessary source voltage for performing the head unloading operation in order to retract the head elements to a predetermined rest position when a shutdown of the primary power source occurs. As illustrated in FIG. 3, the reserve power source system includes CPU 4, primary power source shutdown detecting circuit 5, D/A converter 6, VCM driver 72, a condenser 9, and an A/D converter 8.

In this embodiment, the condenser 9 supplies a reserve source voltage necessary for automatically retracting the head elements to a predetermined rest position when a shutdown of the power source is detected by the primary power source shutdown detecting circuit 5. Thus, the reserve power source for performing a power off unloading operation is supplied from the condenser 9 only.

The primary power source shutdown detecting circuit 5 is connected to the primary power source Vcc through a first power source line 91. The first power source line 91 is coupled to the VCM driver 72 through a first switch unit 81 and a second power source line 92. The second power source line 92 transfers the source voltage Vcc to the head unloading control circuit system that includes CPU 4, D/A converter 6, and the VCM driver 72. The first switch unit 81 is made of a semiconductor, such as, for example a field effect transistor (FET). When the primary power source is supplied to the disk drive 100, CPU 4 provides a first control signal 810 of a high level so as to set the first switch unit 81 in a closed (ON) state. Thus, when the primary power source supplies the source voltage Vcc, the first switch unit 81 is closed (ON) in order to transfer the source voltage Vcc to the VCM driver 72.

If a shutdown of the primary power source occurs, i.e., the primary power source shutdown detecting circuit 5 detects an abnormal state of the power source, the CPU 4 sets the first control signal 810 at a low level in order to open (OFF) the first switch unit 81. Thus, when a shutdown of the primary power source occurs, the first switch unit 81 disconnects the second power source line 92 from the first power source line 91.

CPU 4 is connected to the second power source line 92. CPU 4 further is coupled to the condenser 9 through a second switch unit 82 and a third power source line 93. Thus, the second switch unit 82 and the condenser 9 are sequentially provided between the second power source line 92 and the grounding (GND). The second switch unit 82 is also made of a semiconductor, such as, for example, a FET. During a normal condition, the second switch unit 82 is closed (ON) so as to charge the condenser 9 by the primary source voltage Vcc.

When the primary power source shutdown detecting circuit 5 detects a shutdown of the primary power source, the detecting signal is supplied to CPU 4. Then, CPU 4 sets a second control signal 820 at a low level in order to open (OFF) the second switch unit 82. Thus, the reserve power charged in the condenser 9 is used for the head unloading control circuit.

The third power source line 93 is coupled to a fourth power source line 94 through a third switch unit 83. The fourth power source line 94 is coupled to CPU 4 through the analog/digital (A/D) converter 8. Further, the fourth power source line 94 is grounded through a resister 12. The third switch unit 83 also is made of a semiconductor, such as, for example a FET. During the normal condition of the disk drive 100, the third switch unit 83 is opened (OFF). When CPU 4 judges the battery voltage of the condenser 9, CPU 4 sets a third control signal 830 at a high level in order to close (ON) the third switch unit 83. Thus, the fourth power source line 94 is used for supplying the battery voltage charged in the condenser 9 to the A/D converter in order to measure the battery voltage charged in the condenser 9.

During a normal condition, CPU 4 sets both the first and second control signals 810 and 820 at a high level in order to close both the first and second switch units 81 and 82. On the other hand, when CPU 4 judges the reserve power voltage of the condenser 9, the first and second control signals 810 and 820 are changed to a low level in order to open the first and second switch units 81 and 82. Further CPU 4 sets the third control signal 830 at a high level in order to close the third switch unit 83.

When the second switch 82 is opened and the third switch 83 is closed, the battery voltage charged in the condenser 9 is supplied to CPU 4 through the A/D converter 8. The analog value of the battery voltage of the condenser 9 is converted to a digital value in order to supply to CPU 4.

Based on the digital value of the battery voltage supplied from the A/D converter 8, the CPU 4 judges whether the battery voltage of the condenser 9 is in a normal state or in an abnormal state.

Figure 4:
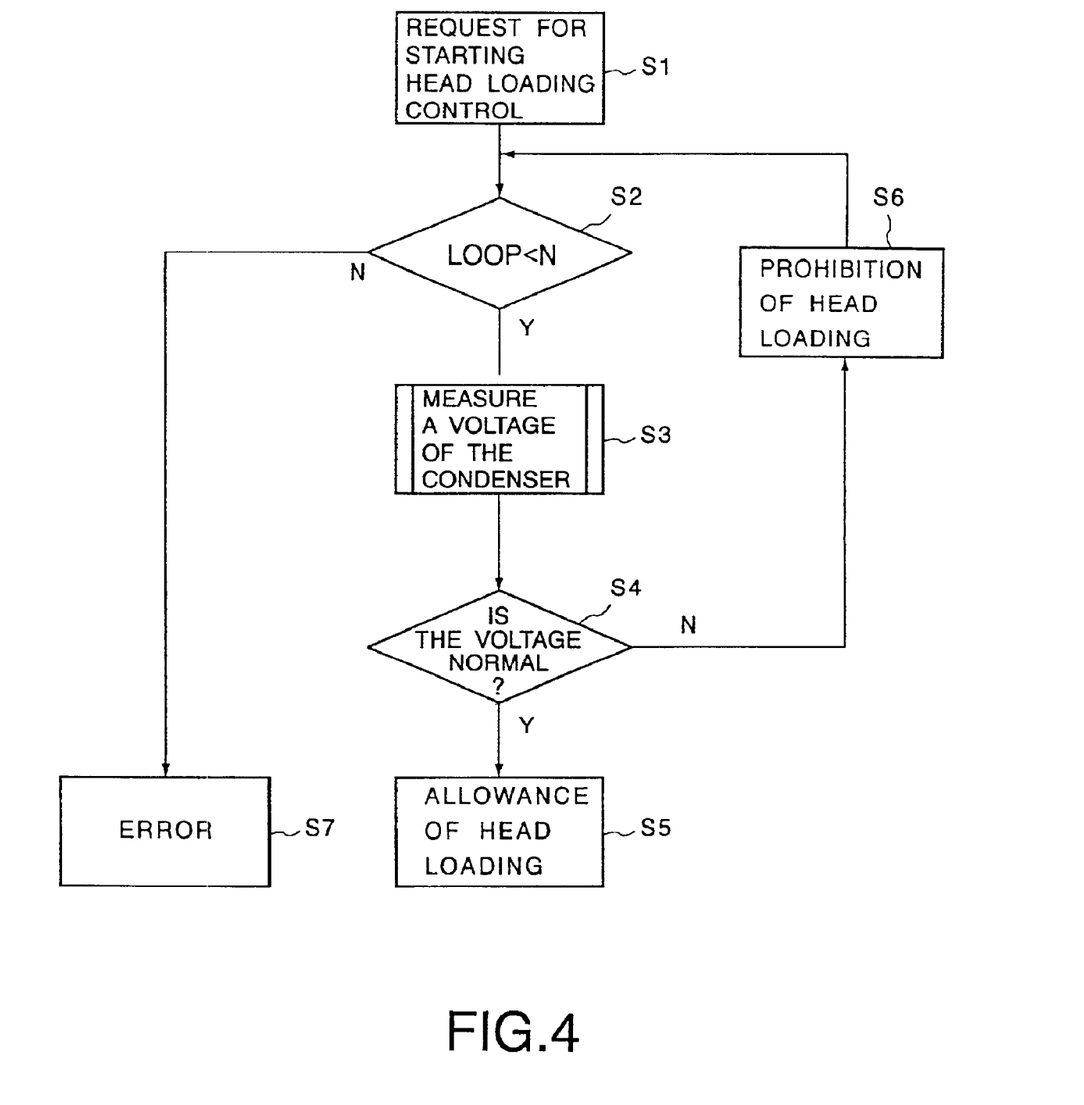
FIG. 4 is a flow chart for explaining operations for judging control propriety of head loading in the configuration illustrated in FIG. 3.

FIG. 4 explains how CPU 4 judges as to the head loading propriety. In the disk drive consistent with the invention, CPU 4 judges as to the head loading propriety prior to CPU 4 actually starting the head loading control. Either when the primary power source voltage Vcc is supplied to the disk drive 100, or when a host system gives an instruction to the SPM 71 for rotating the disk 10, in order to load head elements from a retracted position onto the disk 10, CPU 4 starts a request for starting head loading control (step S1). When the request is started, CPU 4 judges whether the number of prohibition times of the head loading associated with the request is not exceeded a predetermined number of times (loop) N (step S2). If the prohibition times do not exceed the predetermined loop times N (step S2, Yes), CPU 4 measures a battery voltage of the condenser 9 (step S3). Based on the measurement, the CPU 4 judges whether the battery voltage of the condenser 9 is a normal state (step S4).

When CPU 4 judges that the battery voltage of the condenser 9 is a normal state (step S4, Yes), CPU 4 allows the head loading operation to start (step S5). Thus, only when CPU 4 judges that the reserve power source has a sufficient power voltage for unloading the head to the retract position is the head loading operation allowed to start.

On the contrary, if the battery voltage of the condenser 9 is judged as an abnormal state (step S4, No), CPU 4 temporarily prohibits the start of the head loading operation (step S6). By temporarily prohibiting the head loading operation, CPU 4 again monitors the battery voltage of the condenser 9. Since a predetermined processing time is needed for each measuring of the battery voltage of the condenser 9, it may be possible to charge a sufficient battery voltage in the condenser 9 through the primary source voltage Vcc while CPU 4 repeats the measuring of the battery voltage at several times, if the associated circuits keep its normal conditions.

Even when CPU 4 has repeatedly monitored the battery voltage more than the predetermined loop number of times N, if the battery voltage of the condenser 9 still does not reach a normal value (step S2, No), CPU 4 judges that some error occurs in the condenser 9 (step S7). Thus, CPU 4 does not start the head loading control, but it sends a warning notice to a user through the host system.

Figure 5:
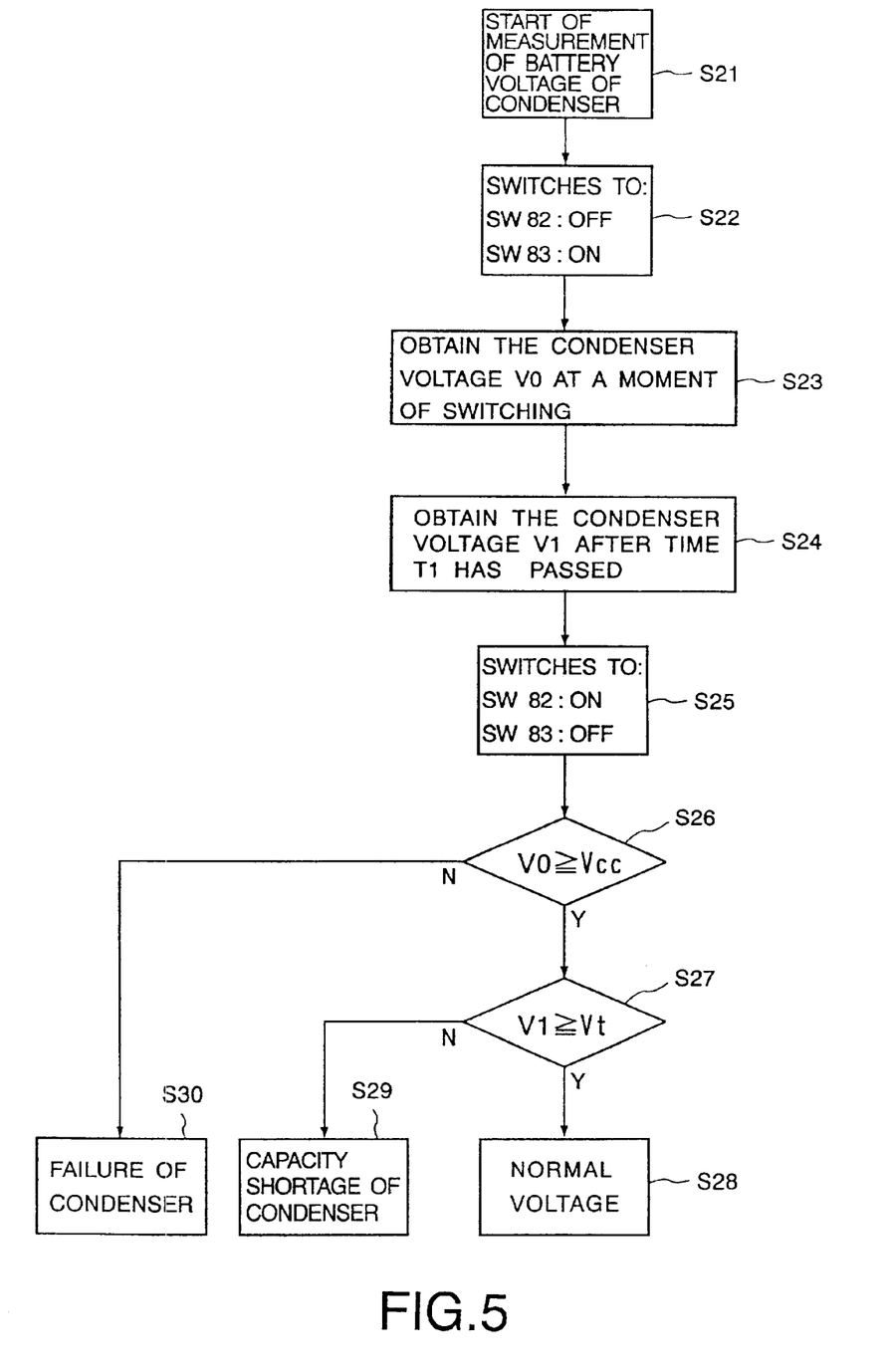
FIG. 5 is a flowchart for measuring a battery voltage of the condenser illustrated in FIG. 3.

In order to judge whether the battery voltage of the condenser 9 is a normal state or an abnormal state at the step S3 in FIG. 4, CPU 4 compares the measured battery voltage of the condenser 9 to a predetermined set value. FIG. 5 explains the judging method. When a measurement of the battery voltage of the condenser 9 is started (step S21), CPU 4 provides instructions to change the second switch element 82 to an OFF (open) state and also the third switch element 83 to an ON (closed) state (step S22). At the moment of the switching when both switch elements 82 and 83 are changed, CPU 4 may obtain an initially measured voltage V0 of the condenser 9 through the A/D converter 8 (step S23). After a predetermined time T1 has passed from changing the switches, CPU 4 again obtains a second measured voltage V1 of the condenser 9 (step S24).

Here, the second and third switch elements 82 and 83 are respectively changed to an opposite state. Thus, the second switch 82 is changed to an ON (close) state and the third switch element 83 is changed to an OFF (open) state (step S25). Then, CPU 4 compares the initially measured voltage V0 of the condenser 9 with the primary power source voltage Vcc (step S26). If the initial condenser voltage V0 does not reach to the primary power source voltage Vcc (step S26, No), CPU 4 judges that the condenser 9 may include some failures (step S30). On the other hand, if the initial condenser voltage V0 exceeds the primary power source voltage Vcc (step S26, Yes), CPU 4 compares the second measured voltage V1 of the condenser 9 at the time T1 with a required minimum voltage Vt at the same time T1 (step S27). If the second measured condenser voltage V1 does not reach to the required minimum voltage Vt at the time T1 (step S27, No), CPU 4 judges that the capacity of the condenser 9 still falls short (step S29). Only when the second measured condenser voltage V1 exceeds the required minimum voltage Vt at the time T1 (step S27, Yes) does CPU 4 judge that the voltage charged in the condenser is in a normal state (step S28). Thus CPU 4 judges that a sufficient voltage for performing power-off head unloading operation has been charged in the condenser 9 as a reserve power source.

Figure 6:
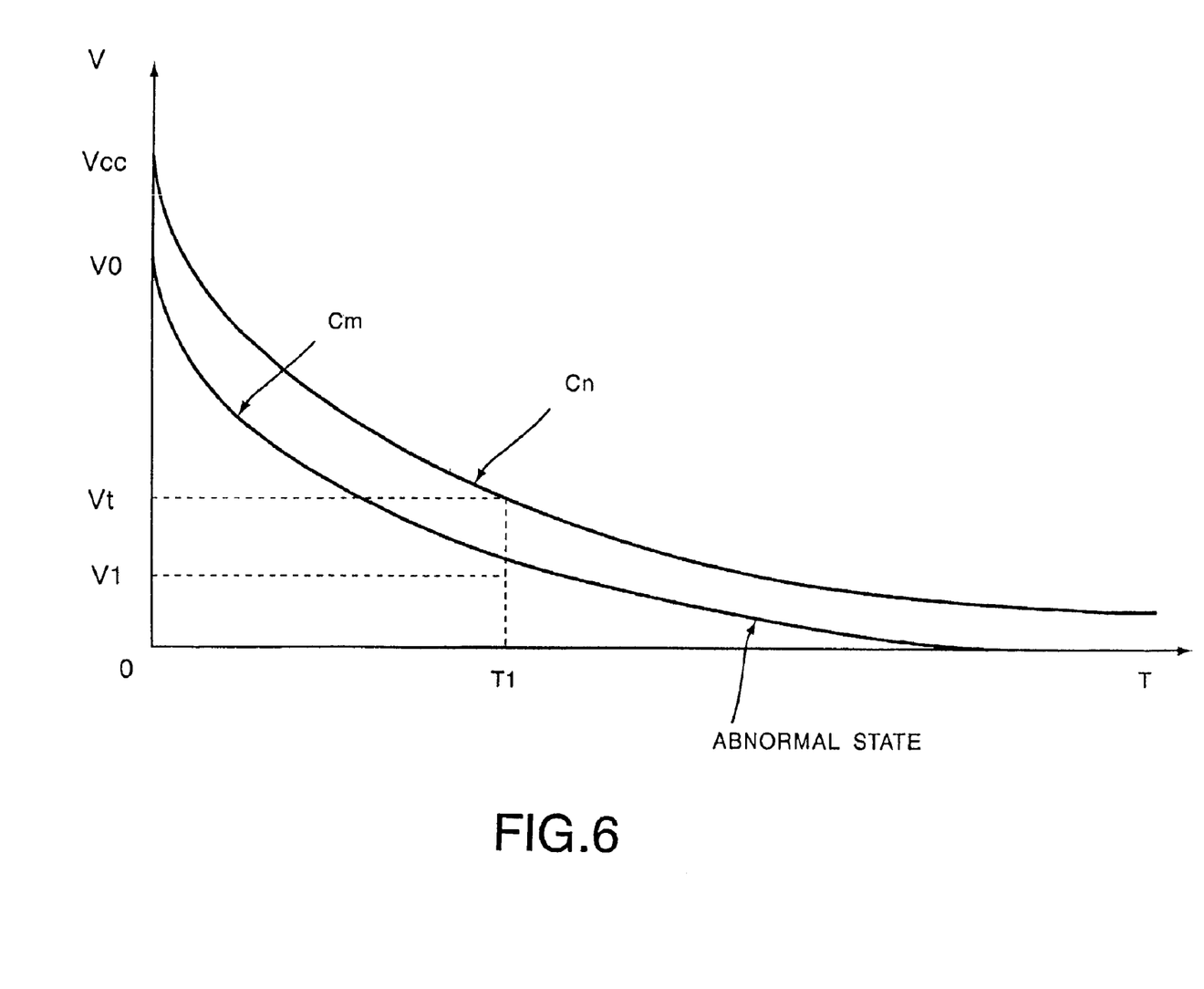
FIG. 6 illustrates a permissible voltage curve in order to explain a method for judging normal/abnormal states of the condenser illustrated in FIG. 3.

FIG. 6 illustrates a permissible voltage curve for explaining how to judge the normal/abnormal state of the condenser as the reserve power source. In FIG. 6, an abscissa axis shows the time T and an ordinate axis shows the voltage V charged in the condenser 9. If the condenser 9 is a normal state, the allowable condenser voltage curve Cn descends gradually from the primary power source battery voltage Vcc at the time T0 as a function of time. On the contrary, if the measured condenser voltage V0 at the time T0 does not reach the primary power source voltage Vcc, as illustrated as the measured condenser voltage curve Cm, it is judged as that the voltage charged in the condenser 9 is not sufficient for performing a head unloading operation. Even if the battery voltage Vcc has been charged at the time T0, the voltage curve descends abruptly with time, and at the time, T1, it may fall down lower than the required minimum voltage Vt at the time T1. When the condenser 9 includes some failures, or damage, the measured condenser voltage almost time independent since the voltage is not charged in the condenser 9.

Figure 7:
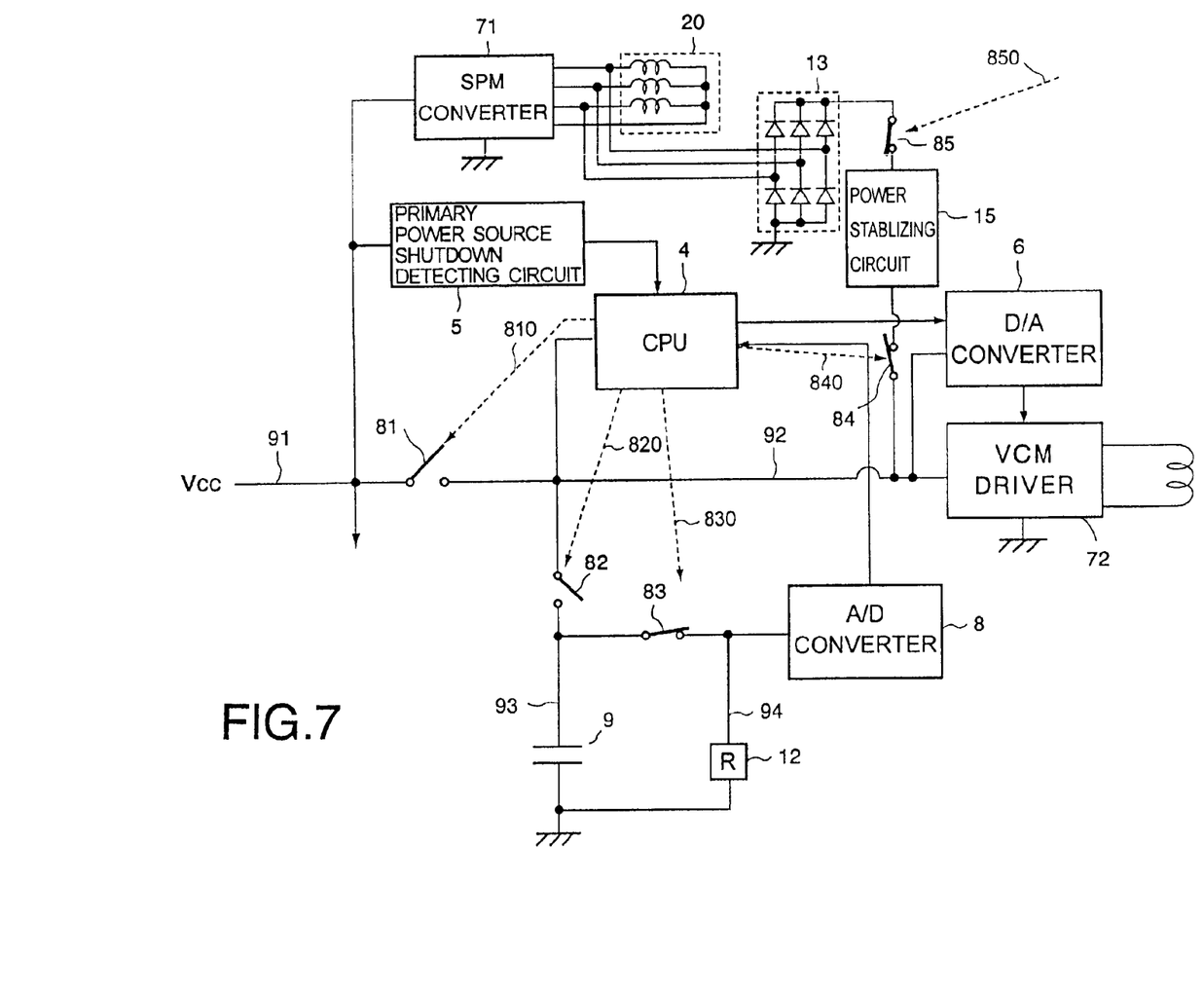
FIG. 7 is a functional block diagram for another exemplary configuration for a reserve power source for achieving a reliable head unloading operation at a shutdown of the power source of the magnetic disk drive apparatus.

FIG. 7 illustrates another embodiment of the reserve power system applicable to the magnetic disk drive apparatus, consistent with the invention. In this embodiment, a reserve voltage power necessary for performing the power-off head unloading operation is supplied from both the condenser 9 and the back electromotive voltage of the SPM 20.

As illustrated in FIG. 7, the SPM 20 includes three phase (U,V and W) coils. The SPM driver 71 rotates the SPM 20 at a predetermined speed by controlling current currents passing through each of the coils of the SPM 20. With rotation of the three phase coils in the SPM 20, it generates an induced alternate back electromotive voltage. In order to obtain the reserve power by using the back electromotive voltage, the reserve power system includes a rectifying circuit 13 for rectifying the back electromotive voltage and a power source stabilizing circuit 15 for stabilizing the outputs of the rectifying circuit 13. The power source stabilizing circuit 13 is comprised of a DC-DC converter.

A fourth switch unit 84 is provided between the output of the power source stabilizing circuit 15 and the second power source line 92. CPU 4 delivers a fourth control signal 840 for controlling ON/OFF operations of the fourth switch unit 84. Further, a fifth switch unit 85 is provided between the output of the rectifying circuit 13 and the power source stablizing circuit 15. CPU 4 delivers a fifth control signal 850 for controlling ON/OF operations of the fifth switch unit 85.

Both the fourth and fifth switch units 84, 85 may be comprised of a semiconductor, such as, for example, a FET. When the primary power source for the apparatus is put on, CPU 4 supplies the first and fourth control signals 810 and 840 at a high level for setting the first and fourth switch units 81 and 84 are respectively closed. If a shutdown of the primary power source occurs, the first and fourth switch units 81 and 84 are changed to an ON (closed) state and the fifth switch unit 85 is opened in accordance with the respective first, fourth and fifth switch control signals 810, 840 and 850 supplied from CPU 4.

When a shutdown of the primary power source occurs, since the power supply from the power source line 91 to the SPM driver 71 is cut off, the output from the SPM driver 17 is disabled. However, the SPM 20 still continues to rotate by an inertia force after the output front the SPM driver 71 is disabled. Consequently, each coil in the SPM 20 generates a back electromotive voltage for a while after the shutdown of the power source.

The back electromotive voltages generated by all the coils of the SPM 20 are rectified and converted to DC voltages by the rectifying circuit 13. The fourth and fifth switch elements 84, 85 are closed when the primary power source is shut down by the switch element control signals 840, 850 of a low level. Then the DC voltage output from the rectifying circuit 13 is converted to a stabilized DC voltage through the power source stabilizing circuit 15. The stabilized DC voltage is supplied only to the head unloading control system including CPU 4 through the power source line 92. Consequently, the head unloading control system including CPU 4 can perform the head unloading control operation, even if the primary power source for the apparatus has shut down.

In the embodiment illustrated in FIG. 7, in addition to the battery voltage of the condenser 9, the back electromotive voltage of the SPM 20 is also used as the reserve power source when a shutdown of the primary power source occurs. Consequently, it becomes possible for the condenser 9 to reduce its capacity. Thus, it may reduce a manufacturing cost. By adding the battery voltage of the condenser 9 and the back electromotive voltage of the SPM 20, it may raise the certainty of power off unloading operation.

In the above embodiments, the magnetic disk drive apparatus is explained as a head loading/unloading apparatus. However, the magnetic disk drive apparatus may also be the magnetic disk drive apparatus of the CSS system wherein the head elements 12 are retracted on the CSS area on the disk 10.

As explained above, prior to starting the head loading control, the magnetic disk drive apparatus 100 and method for controlling head unloading operation judges whether a sufficient electric power is secured in a reserve system in order to retract the head elements to a predetermined rest position if a shutdown of the power source occurs. Thus, it becomes possible to perform certainly power off unloading of head elements at the time of shutdown of the power source.

What is claimed is:

1. A magnetic disk drive apparatus having head loading/unloading functions and a head retracting function in order to retract head elements to a predetermined rest position when a shutdown of a primary power source occurs; the apparatus comprising:

a reserve power source configured to charge a power from the primary power source during normal conditions and to discharge the power to retract the head elements during a shutdown of the primary power source;

a detector configured to detect the power charged in the reserve power source before starting a head loading operation;

a judging unit configured to judge whether the reserve power source has charged a necessary power for retracting the head elements to the rest position when a shutdown of the primary power source occurs, based on the detected power; and a control unit configured to allow the head loading operation only when it is judged that the reserve power source has charged the necessary power.

2. The magnetic disk drive apparatus of claim 1, wherein:

the reserve power source includes a condenser configured to store charges from the primary power source.

3. A magnetic disk drive apparatus for writing/reading data through head elements to and from a recording medium, comprising:

a spindle motor configured to rotate the recording medium during data reading/writing operations;

a voice coil motor configured to move the head element along a radius direction of the recording medium;

a head rest unit provided at a predetermined head rest position and configured to retract the head element when the recording medium is in a rotation stop state;

a primary power source configured to supply power voltage to the apparatus;

a detector configured to detect a shutdown of the primary power source;

a controller configured to move the head element to a target position on the recording medium by controlling the voice coil motor during the data reading/writing operations; and a reserve power source configured to supply a power necessary for at least retracting the head elements to the predetermined head rest position when the detector detects a shutdown of the primary power source; wherein:

the controller is configured to retract the head element to the predetermined head rest position by controlling the voice coil motor when the detector detects the shutdown of the primary power source; and wherein the controller is further configured to judge whether the reserve power source holds a sufficient power voltage necessary to retract the head element to the predetermined head rest position before starting a loading control of the head element and to start the loading control of the head element only when it judges that the reserve power source holds a sufficient power voltage.

4. The magnetic disk drive apparatus of claim 3, wherein:

the reserve power source includes a condenser configured to store charges from the primary power source.

5. The magnetic disk drive apparatus of claim 3, wherein:

the controller further controls a power supplier configured to supply a back electromotive force necessary to retract the head element to the predetermined head rest position by using a back electromotive voltage of the spindle motor when the detector detects the shutdown of the primary power source.

6. The magnetic disk drive apparatus of claim 3, further including:

a first power source line configured to supply the primary power source;

a second power source line configured to supply the primary power source supplied through the first power source line to the controller;

a third power source line configured to supply the power source supplied through the second power source line to the condenser;

a fourth power source line configured to supply a power charged in the condenser to the controller; and a switch unit provided between the first and second power source lines; wherein:

the switch unit includes:

a first switch element configured to change from a closing state when the primary power source is being supplied through the first power source line to an opening state when the detector detects the shutdown of the power source; and a second switch element provided between the second and third power source lines so as to change from a closing state when the primary power source is supplied through the first and second power source lines to an opening state when the controller judges the voltage of the reserve power source; and a third switch element provided between the third and fourth power source lines configured to switch to an open state only when the controller judges the voltage of the reserve power source, wherein the controller judges whether the condenser has charged the necessary voltage based on the power supplied through the fourth power source line.

7. A method for controlling the head loading/unloading operation applicable to a magnetic disk drive apparatus having a head retracting function in order to retract head elements to a predetermined rest position by using a reserve power source when a shutdown of a primary power source occurs; the method including:

charging a power in the reserve power source from the primary power source;

detecting the power charged in the reserve power source;

judging whether the reserve power source has charged a necessary power for retracting the head elements to the rest position when a shutdown of the primary power source occurs;

allowing head loading operation only when it is judged that the reserve power source has charged the necessary power.

* * * * *